United States Patent
Harada et al.

(10) Patent No.: US 8,554,065 B2
(45) Date of Patent: Oct. 8, 2013

(54) SHAKE DETECTOR

(75) Inventors: Yasunari Harada, Ebina (JP); Susumu Yamazaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 1311 days.

(21) Appl. No.: 12/328,423

(22) Filed: Dec. 4, 2008

(65) Prior Publication Data

US 2009/0148145 A1    Jun. 11, 2009

(30) Foreign Application Priority Data

Dec. 6, 2007 (JP) ................................. 2007-315732

(51) Int. Cl.
G03B 17/00 (2006.01)
(52) U.S. Cl.
USPC .......................................................... 396/55
(58) Field of Classification Search
USPC .......................................................... 396/55
See application file for complete search history.

(56) References Cited

U.S. PATENT DOCUMENTS

| | | | |
|---|---|---|---|
| 6,393,215 B1 * | 5/2002 | Washisu | 396/52 |
| 6,704,501 B1 * | 3/2004 | Washisu | 396/55 |
| 6,801,247 B1 * | 10/2004 | Ohishi et al. | 348/208.1 |
| 7,720,366 B2 * | 5/2010 | Iwasaki et al. | 396/55 |
| 8,023,811 B2 * | 9/2011 | Kimura | 396/55 |
| RE42,923 E * | 11/2011 | Sango et al. | 396/53 |

FOREIGN PATENT DOCUMENTS

JP    2006-313385 A    11/2006

* cited by examiner

*Primary Examiner* — Rodney Fuller
(74) *Attorney, Agent, or Firm* — Westerman, Hattori, Daniels & Adrian, LLP (57) ABSTRACT

A shake detector includes: a shake detection unit that detects an amount of shake, and outputs a shake detection signal and a reference signal; a signal processing unit that amplifies and smoothes the shake detection signal and the reference signal, and outputs the shake detection signal as a signal used in subsequent processing; an adjustment unit that outputs an adjustment signal for adjusting an output signal from the signal processing unit; and a control operation unit that, in a first period for which there is no shake in the imaging apparatus, stores a control value for controlling the adjustment unit on the basis of the reference signal, and that, in a second period different from the first period, generates a control signal for controlling the adjustment unit on the basis of the reference signal and the stored control value and outputs the control signal.

5 Claims, 4 Drawing Sheets

SHAKE DETECTOR

BACKGROUND OF THE INVENTION

1. Field of the Invention

The present invention relates to a shake detector used for a shake correction mechanism of an imaging apparatus.

Priority is claimed on Japanese Patent Application No. 2007-315732, filed Dec. 6, 2007, the content of which is incorporated herein by reference.

2. Description of Related Art

Conventionally, in an imaging apparatus, such as a camera, there have been proposed various kinds of hand shake correction mechanisms that suppress image blur on an imaged surface of an imaging element, which is caused by hand shake or the like, by shifting an optical system or the imaging element in a planar direction perpendicular to an optical axis according to the amount of shake occurring at the time of photographing. Moreover, in such a hand shake correction mechanism, a shake detector is used to determine the shift position of the optical system or the imaging element. As such a shake detector, there are various shake detectors. For example, Japanese Unexamined Patent Application, First Publication No. 2006-313385 discloses a technique of making it possible to adjust a zero point of shake detection, that is, the amount of shake detection when the shake amount of an imaging apparatus is zero to zero.

Figure 4:
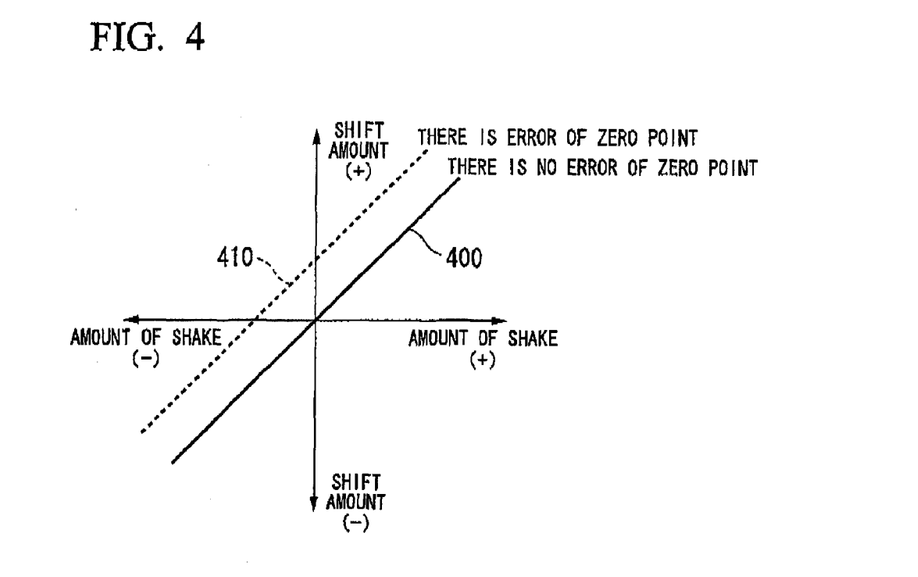
FIG. 4 is a reference view showing the relationship between the amount of shake occurring at the time of photographing with an imaging apparatus and the shift amount by which an optical system or an imaging element is made to move in a planar direction perpendicular to an optical axis.

FIG. 4 shows the relationship between the amount of shake occurring at the time of photographing with an imaging apparatus and the shift amount by which an optical system or an imaging element is made to move in a planar direction perpendicular to the optical axis. A solid line 400 of FIG. 4 indicates those described below. That is, when the amount of shake in the + direction occurs at the time of photographing with an imaging apparatus, the shake is corrected by setting the shift amount of an optical system or an imaging element in the + direction according to the amount of shake. In addition, when the amount of shake in the − direction occurs at the time of photographing with the imaging apparatus, the shake is corrected by setting the shift amount of the optical system or the imaging element in the − direction according to the amount of shake. In addition, when the amount of shake occurring at the time of photographing with the imaging apparatus is zero, the shake is not corrected by setting the shift amount of the optical system or the imaging element to zero.

That is, when there is no error of a zero point like the solid line 400 of FIG. 4, the optical system or the imaging element can be suitably shifted in the planar direction perpendicular to the optical axis according to the amount of shake occurring at the time of photographing with the imaging apparatus. However, when there is an error of a zero point like a dotted line 410 of FIG. 4, the optical system or the imaging element cannot be suitably shifted in the planar direction perpendicular to the optical axis according to the amount of shake occurring at the time of photographing with the imaging apparatus. As a result, the quality of a photographed image is degraded. That is, in order to detect the amount of shake occurring at the time of photographing with high precision, it becomes necessary to correct a zero point with high precision at the time of photographing.

Figure 5:
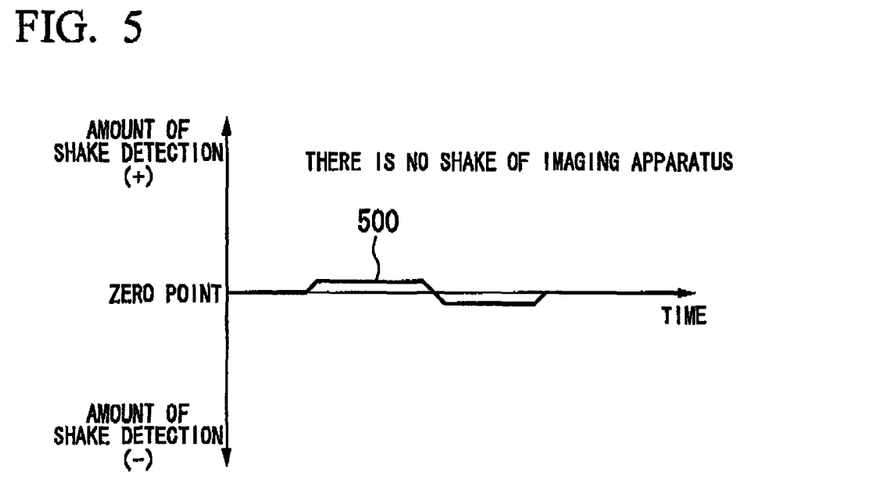
FIG. 5 is a reference view showing the relationship between an amount of shake detection and a time, in the case in which there is no shake occurring at the time of photographing with an imaging apparatus.

FIG. 5 shows an example of the relationship between an amount of shake detection and a time when there is no shake occurring at the time of photographing with an imaging apparatus. As indicated by the solid line 500 of FIG. 5, the amount of shake detection when there is no shake of the imaging apparatus changes due to changing external factors, such as an offset voltage and an ambient temperature, even though there is no shake occurring in the imaging apparatus. For this reason, the shake detector detects a change in the amount of shake detection and performs correction such that the amount of shake detection always matches the zero point. Since this change does not include the amount of shake occurring in the imaging apparatus and the change is also very gentle, the zero point can be corrected with high precision.

Figure 6:
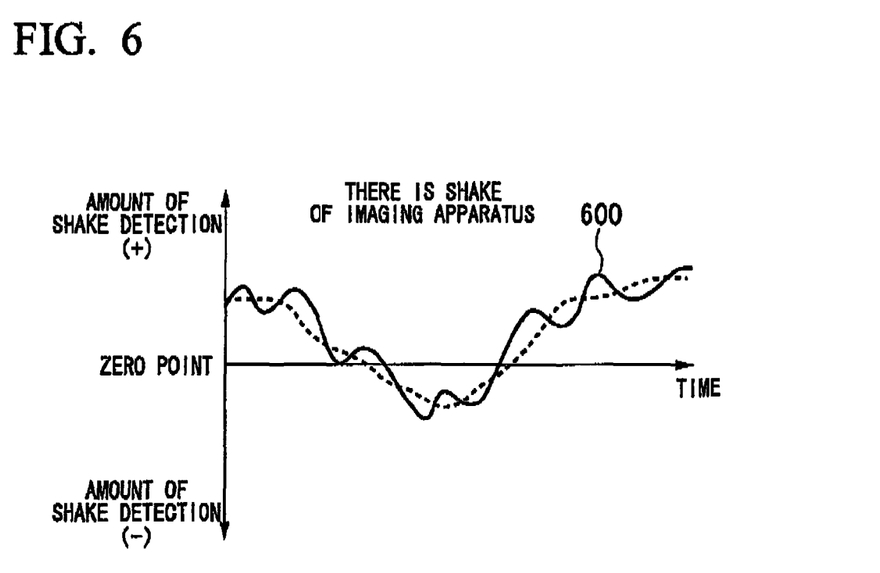
FIG. 6 is a reference view showing the relationship between an amount of shake detection and a time, in the case in which there is shake occurring at the time of photographing with an imaging apparatus.

FIG. 6 shows an example of the relationship between an amount of shake detection and a time when there is shake occurring at the time of photographing with an imaging apparatus. As indicated by a solid line 600 of FIG. 6, the amount of shake detection when there is shake of the imaging apparatus largely changes due to not only changing external factors, such as the offset voltage and the ambient temperature, but also shake occurring in the imaging apparatus. For this reason, the shake detector detects a change in the amount of shake detection and performs correction such that the amount of shake detection always matches the zero point. In order to calculate the amount of shake detection when shake does not occur while shake is occurring in the imaging apparatus, it is necessary to perform signal processing for removing shake, for example, to average shake detection signals including the amount of shake.

SUMMARY OF THE INVENTION

According to an aspect of the invention, a shake detector includes: a shake detection unit that detects an amount of shake of an imaging apparatus, and outputs a shake detection signal indicating the detected amount of shake and a reference signal used as a reference of the shake detection signal; a signal processing unit that amplifies and smoothes the shake detection signal and the reference signal from the shake detection unit, and outputs the shake detection signal as a signal used in subsequent processing for offsetting the amount of shake of the imaging apparatus; an adjustment unit that outputs an adjustment signal for adjusting an output signal from the signal processing unit; and a control operation unit that in a first period for which there is no shake in the imaging apparatus, stores a control value for controlling the adjustment unit such that the output signal from the signal processing unit has a predetermined value on the basis of the reference signal from the shake detection unit, and that in a second period different from the first period, generates a control signal for controlling the adjustment unit on the basis of the reference signal from the shake detection unit and the stored control value and outputs the control signal.

Furthermore, in the shake detector according to the aspect of the invention, preferably, an A/D conversion unit that converts the shake detection signal and the reference signal from the shake detection unit, which are analog signals, into digital signals is further included and the signal processing unit amplifies and smoothes the shake detection signal and the reference signal in a digital space.

Furthermore, in the shake detector according to the aspect of the invention, preferably, in the first period, the control operation unit stores the control value for controlling the adjustment unit such that the output signal from the signal processing unit becomes equal to a midpoint voltage of a maximum output voltage and a minimum output voltage of the signal processing unit on the basis of the reference signal from the shake detection unit.

Furthermore, in the shake detector according to the aspect of the invention, it is preferable that the second period be a period after the imaging apparatus is powered on.

Furthermore, in the shake detector according to the aspect of the invention, it is preferable that the second period be a period after a release switch of the imaging apparatus is set.

DETAILED DESCRIPTION OF THE INVENTION

Hereinafter, embodiments of the invention will be described with reference to the accompanying drawings.

First Embodiment

Figure 1:
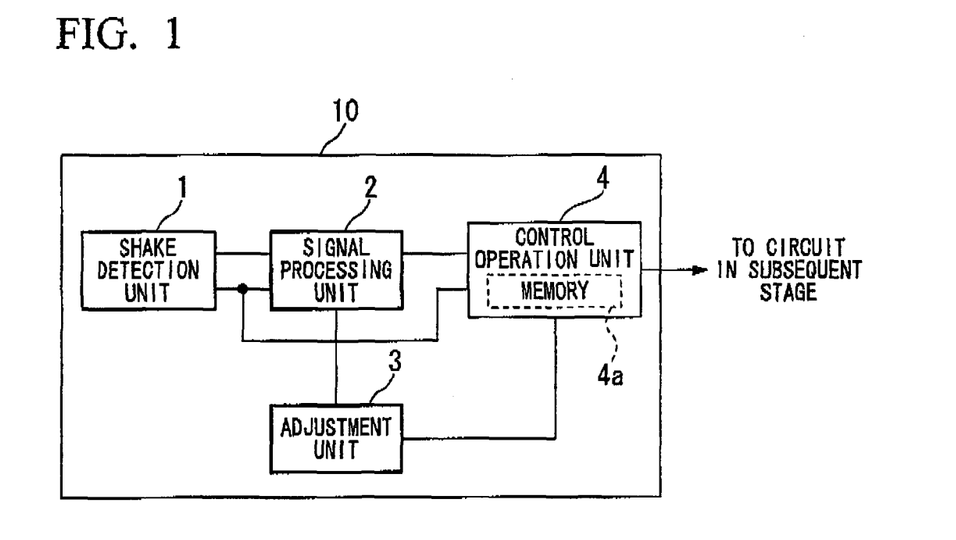
FIG. 1 is a block diagram showing the configuration of shake detector according to a first embodiment of the invention.
Figure 2:
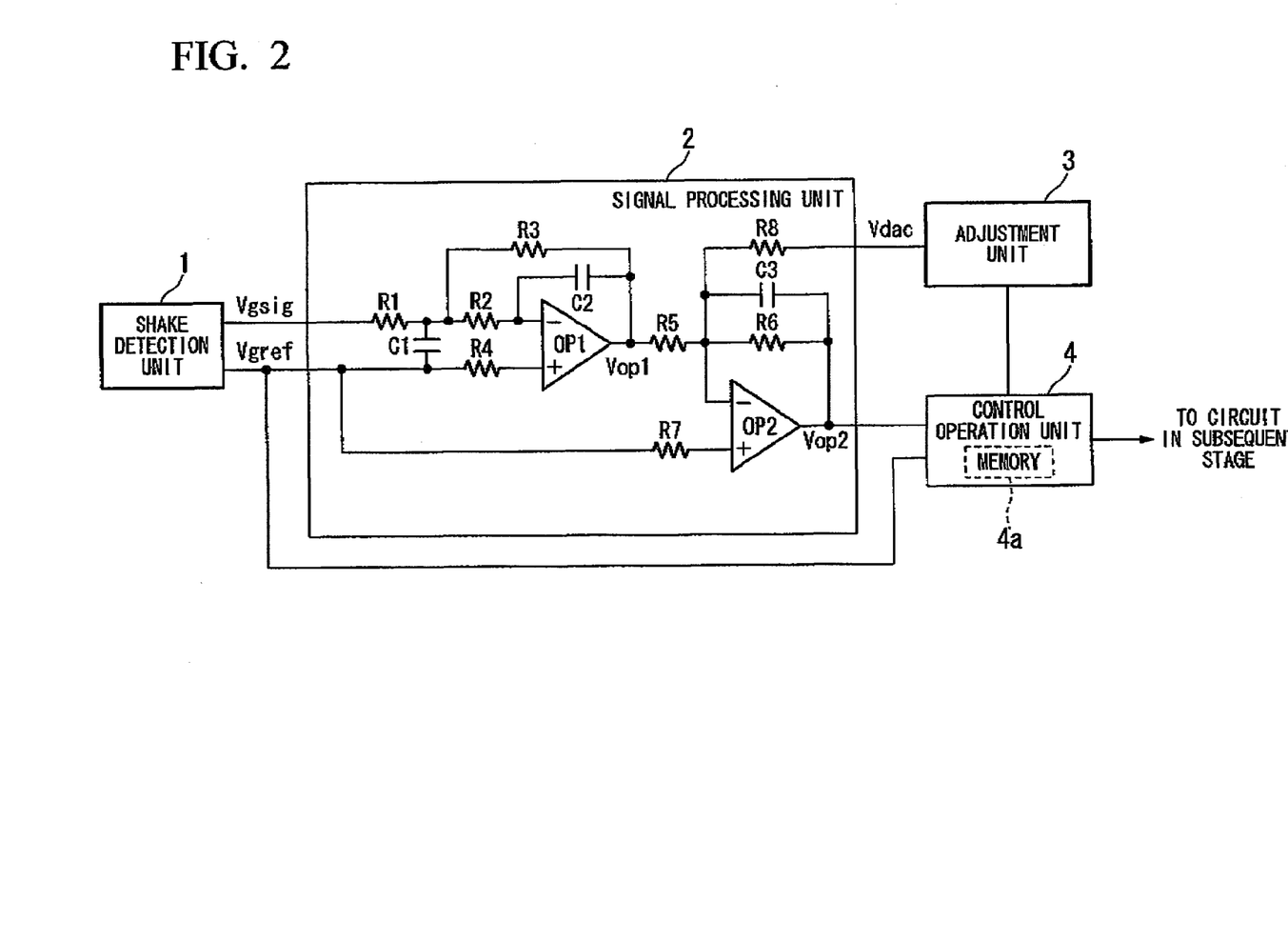
FIG. 2 is a block diagram showing the configuration of the shake detector according to the first embodiment of the invention.

First, a first embodiment of the invention will be described. FIG. 1 shows the configuration of a shake detector 10 according to the present embodiment. The shake detector 10 shown in FIG. 1 includes a shake detection unit 1, a signal processing unit 2, an adjustment unit 3, and a control operation unit 4. FIG. 2 shows the configuration of the shake detector 10 including the detailed configuration of the signal processing unit 2.

The shake detection unit 1 detects an amount of shake of an imaging apparatus and outputs a shake detection signal indicating the detected amount of shake and a shake reference signal used as a reference of the shake detection signal. The shake detection signal is a signal corresponding to the amount of shake using the shake reference signal as a reference. The signal processing unit 2 amplifies and smoothes the shake detection signal and the shake reference signal from the shake detection unit 1. The signal processing unit 2 is configured to include a secondary LPF type amplifier circuit, which includes resistors R1, R2, R3, and R4, capacitors C1 and C2, and an operational amplifier OP1, and an amplifier circuit, which includes resistors R5, R6, R7, and R8, a capacitor C3, and an operational amplifier OP2. The adjustment unit 3 adjusts an output signal from the signal processing unit 2.

The control operation unit 4 converts the output signal from the signal processing unit 2 in a format suitable for a circuit (circuit that calculates a shift amount for shifting an optical system or an imaging element in the planar direction perpendicular to the optical axis in order to offset the amount of shake of the imaging apparatus) provided in a subsequent stage. In addition, the control operation unit 4 generates a control signal for controlling the adjustment unit 3 on the basis of the shake reference signal from the shake detection unit 1 and outputs the control signal to the adjustment unit 3, in order to correct a zero point such that the output signal from the signal processing unit 2 when the amount of shake detected by the shake detection unit 1 is zero has a predetermined value. The control operation unit 4 has a memory 4a and stores a control value for correction of a zero point in the memory 4a.

Next, an operation of the shake detector 10 according to the present embodiment will be described. First, an operation of the shake detector 10 in a period (hereinafter, referred to as a first period) for which the imaging apparatus is held in a sufficiently stable state except for the timing related to actual photographing of a photographic subject for example a period when performing shipping inspection of an imaging apparatus, will be described. The shake detection unit 1 detects that shake of the imaging apparatus occurring at the time of photographing is zero, outputs a shake detection signal, which is used to shift the optical system or the imaging element to a middle position of a range movable in the planar direction perpendicular to the optical axis, to the signal processing unit 2, and outputs a shake reference signal used as a reference voltage of the shake detection signal to the signal processing unit 4. In general, the shake reference signal changes due to changing external factors, such as an offset voltage and an ambient temperature.

Here, assuming that a shake detection signal is Vgsig, a shake reference signal when an changing external factor Vc is taken into consideration is Vgref+Vc, and a signal indicating the amount of shake detected by the shake detection unit 1 is Vg, the following expression (1) is obtained.

$$Vgsig = Vgref + Vc + Vg \qquad (1)$$

Since, in the first period, the imaging apparatus is held in the sufficiently stable state and the amount of shake of the imaging apparatus occurring at the time of test photographing of a photographic subject is zero, the following expression (2) is obtained from the expression (1).

$$Vgsig = Vgref + Vc \qquad (2)$$

The signal processing unit 2 amplifies and smoothes a differential voltage between the shake reference signal and the shake detection signal from the shake detection unit 1, and outputs the result to the control operation unit 4. Here, assuming that an output voltage of the operational amplifier OP1 in the signal processing unit 2 is Vop1, the following expression (3) is obtained.

$$Vop1 = \frac{R3}{R1}(Vgref + Vc - Vgsig) + Vgref + Vc \qquad (3)$$

In addition, the following expression (4) is obtained by substituting the expression (2) into the expression (3).

$$Vop1 = Vgref + Vc \qquad (4)$$

In addition, assuming that an output voltage of the operational amplifier OP2 in the signal processing unit 2 is Vop2 and an output voltage from the adjustment unit 3 is Vdac the following expression (5) is obtained.

$$Vop2 = \\ \frac{R6}{R5}(Vgref + Vc - Vop1) + \frac{R6}{R8}(Vgref + Vc - Vdac) + Vgref + Vc \qquad (5)$$

In addition, the following expression (6) is obtained by substituting the expression (4) into the expression (5).

$$Vop2 = \frac{R6}{R8}(Vgref + Vc - Vdac) + Vgref + Vc \qquad (6)$$

The control operation unit 4 receives the shake reference signal from the shake detection unit 1, generates a control signal for controlling the adjustment unit 3 such that an output voltage from the signal processing unit 2 becomes a predetermined value on the basis of the shake reference signal, outputs the control signal to the adjustment unit 3, and stores a control value related to the control of the adjustment unit 3 in the memory 4a. The adjustment unit 3 generates an adjustment signal corresponding to the control signal from the control operation unit 4 and outputs the adjustment signal to the signal processing unit 2.

Here, in order to improve the detection accuracy of a zero point, it is necessary to adjust the control signal of the adjustment unit 3 such that the output voltage from the signal processing unit 2 becomes a predetermined value according to a change of the shake reference signal caused by a changing external factor. In addition, it is desirable to control the adjustment unit 3 such that the predetermined value becomes equal to a midpoint voltage of the signal processing unit 2, at which an output voltage range is widest, in consideration of appropriately detecting the amount of shake of the imaging apparatus occurring when the imaging apparatus is held in an unstable state. Accordingly, assuming that an ideal output voltage of the operational amplifier OP2 in the signal processing unit 2 is Vop2_ideal, a maximum output voltage is Vomax, and a minimum output voltage is Vomin, the following expression (7) is obtained.

$$Vop2\_ideal = \frac{Vomax - Vomin}{2} \qquad (7)$$

Therefore, from the expressions (6) and (7), the control operation unit 4 adjusts the output voltage from the signal processing unit 2 to a predetermined value according to the change of the shake reference signal caused by a changing external factor, by generating a control signal, which makes the output voltage of the adjustment unit 3 become the following expression (8), and outputting the control signal to the adjustment unit 3. In addition, the control operation unit 4 makes the control value used for the control of the adjustment unit 3 in the first period stored in the memory 4a. This specific example will be described later.

$$Vdac = Vgref + Vc - \frac{R8}{R6}\left[\left(\frac{Vomax - Vomin}{2}\right) - Vgref - Vc\right] \qquad (8)$$

Next, an operation of the shake detector 10 in a period (hereinafter, referred to as a second period) for which the imaging apparatus is not fixed to an antivibration device, such as a tripod, and is held in an unstable state at timing related to actual photographing of a photographic subject, for example a period after turning on the power of the imaging apparatus or setting a release switch, will be described. The shake detection unit 1 detects an amount of shake of the imaging apparatus occurring at the time of photographing, outputs a shake detection signal, which is used to shift the optical system or the imaging element in the planar direction perpendicular to the optical axis according to the detected amount of shake, to the signal processing unit 2, and outputs a shake reference signal used as a reference voltage of the shake detection signal to the signal processing unit 2 and the control operation unit 4. In general, the shake reference signal changes to a different value from that in the first period due to changing external factors, such as the ambient temperature.

Here, assuming that a shake detection signal is Vgsig', a shake reference signal when a changing external factor Vc+ΔVc is taken into consideration is Vgref+Vc+ΔV, and a signal indicating the amount of shake detected by the shake detection unit 1 is Vg', the following expression (9) is obtained. The shake reference signal Vgref+Vc+ΔV in the second period shows that a change of ΔV occurs in the shake reference signal Vgref+Vc in the first period.

$$Vgsig' = Vgref + Vc + \Delta V + Vg' \qquad (9)$$

Since the imaging apparatus is held in an unstable state in the second period, the amount of shake of the imaging apparatus occurring at the time of actual photographing of a photographic subject does not become zero. The signal processing unit 2 amplifies and smoothes a differential voltage between the shake reference signal and the shake detection signal from the shake detection unit 1 and outputs the result to the control operation unit 4. Here, assuming that an output voltage of the operational amplifier OP1 in the signal processing unit 2 is Vop1', the following expression (10) is obtained.

$$Vop1' = \frac{R3}{R1}(Vgref + Vc + \Delta V - Vgsig') + Vgref + Vc + \Delta V \qquad (10)$$

In addition, the following expression (11) is obtained by substituting the expression (9) into the expression (10).

$$Vop1' = \frac{R3}{R1}(-Vg') + Vgref + Vc + \Delta V \qquad (11)$$

In addition, assuming that an output voltage of the operational amplifier OP2 in the signal processing unit 2 is Vop2' and an output voltage from the adjustment unit 3 is Vdac', the following expression (12) is obtained.

$$Vop2' = \frac{R6}{R5}(Vgref + Vc + \Delta V - Vop1') + \qquad (12)$$
$$\frac{R6}{R8}(Vgref + Vc + \Delta V - Vdac') + Vgref + Vc + \Delta V$$

In addition, the following expression (13) is obtained by substituting the expression (11) into the expression (12).

$$Vop2' = \qquad (13)$$
$$\frac{R6}{R5}\frac{R3}{R1}Vg' + \frac{R6}{R8}(Vgref + Vc + \Delta V - Vdac') + Vgref + Vc + \Delta V$$

The control operation unit 4 receives the shake reference signals, generates a control signal for controlling the adjustment unit 3 such that an output voltage from the signal processing unit 2 becomes a predetermined value on the basis of a difference between the shake reference signals in the first and second periods, and outputs the control signal to the adjustment unit 3. The adjustment unit 3 generates an adjustment signal corresponding to the control signal from the control operation unit 4 and outputs the adjustment signal to the signal processing unit 2. This specific example will be described later.

Here, it is desirable to control the adjustment unit 3 such that the predetermined value becomes equal to a midpoint voltage of the signal processing unit 2, at which an output voltage range is widest, in consideration of appropriately detecting the amount of shake of the imaging apparatus occurring when the imaging apparatus is held in an unstable state. Therefore, the control operation unit 4 generates a control signal, which makes the output voltage of the adjustment unit 3 become the following expression (14) obtained by substituting Vop2_ideal of the expression (7) into Vop2' of the expression (13), and outputs the control signal to the adjustment unit 3.

$$Vdac' = \qquad (14)$$
$$Vgref + Vc + \Delta V - \frac{R8}{R6}\left[\left(\frac{Vo\max - Vo\min}{2}\right) - Vgref - Vc - \Delta V\right]$$

From the expressions (13) and (14), the output voltage from the signal processing unit 2 is adjusted like the following expression (15). The above operation is continuously performed until the imaging apparatus is powered off or the release switch is released.

$$Vop2' = \frac{R6}{R5}\frac{R3}{R1}Vg' + \left(\frac{Vo\max - Vo\min}{2}\right) \qquad (15)$$

The technical meaning in performing the above-described adjustment is as follows. In the first period for which shake of the imaging apparatus is zero, adjusting the output voltage of the adjustment unit 3 like the expression (8) on the basis of the shake reference signal is to adjust the output voltage of the signal processing unit 2 like the expression (7), and is equivalent to correcting a zero point to a midpoint voltage of the signal processing unit 2. In addition, in the second period for which shake of the imaging apparatus occurs, adjusting the output voltage of the adjustment unit 3 like the expression (14) on the basis of the shake reference signal and a correction result of the zero point in the first period is to adjust the output voltage from the signal processing unit 2 like the expression (15), and is equivalent to correcting a zero point to the midpoint voltage of the signal processing unit 2. Therefore, it becomes possible to correct the zero point on the basis of the shake reference signal not including the amount of shake.

Hereinafter, a specific example of an operation performed by the control operation unit 4 will be described. In the first period, the control operation unit 4 makes a voltage value Vgref+Vc of the received shake reference signal stored as a control value in the memory 4a. Then, in the second period, the control operation unit 4 reads the voltage value Vgref+Vc of the shake reference signal from the memory 4a and calculates $\Delta V$ by taking a difference between a voltage value Vgref+Vc+$\Delta V$ of the received shake reference signal and the voltage value Vgref+Ve of the shake reference signal. The control operation unit 4 substitutes the voltage value Vgref+Vc of the shake reference signal in the first period, which has been read from the memory 4a, and $\Delta V$ into the expression (14), thereby calculating the output voltage of the adjustment unit 3. The control operation unit 4 generates a control signal for adjusting the output voltage of the adjustment unit 3 and outputs the control signal to the adjustment unit 3.

As described above, according to the present embodiment, it becomes possible to correct a zero point in the first period by controlling the output voltage of the adjustment unit 3 on the basis of the shake reference signal not including the amount of shake, and to correct a zero point in the second period by controlling the output voltage of the adjustment unit 3 on the basis of the shake reference signal and the correction result (control value) of the zero point in the first period. Therefore, the correction accuracy of a zero point can be improved and the shake detection accuracy can be improved. As a result, the shift position of the optical system or the imaging element of the imaging apparatus can be determined with high precision according to the amount of shake occurring at the time of photographing.

In addition, by setting the start time of the second period to be later than a time at which the release switch is set, it is possible to stop an operation of the shake detector until the release switch is set after the imaging apparatus is powered on. As a result, the power consumption can be reduced.

Second Embodiment

Figure 3:
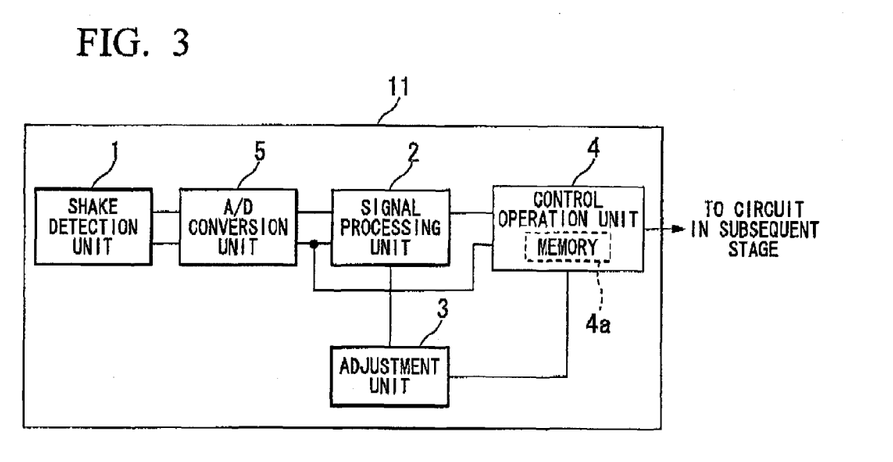
FIG. 3 is a block diagram showing the configuration of a shake detector according to a second embodiment of the invention.

Next, a second embodiment of the invention will be described. FIG. 3 shows the configuration of a shake detector 11 according to the present embodiment, and the same elements as in FIGS. 1 and 2 are denoted by the same reference numerals, The shake detector 11 is different from that in the first embodiment in that an A/D conversion unit 5 is inserted between the shake detection unit 1 and the signal processing unit 2 and various Idnds of signal processing in the shake detector 11 are performed in a digital space. A basic operation of the shake detector 11 other than that described above is the same as that of the shake detector 10 according to the first embodiment.

Next, an operation of the shake detector 11 according to the present embodiment will be described. First, an operation of the shake detector 11 in a period (hereinafter, referred to as a first period) for which an imaging apparatus is held in a sufficiently stable state except for the timing related to actual photographing of a photographic subject, for example a period when performing shipping inspection of an imaging apparatus, will be described. The shake detection unit 1 detects that shake of the imaging apparatus occurring at the time of photographing is zero and outputs a shake detection signal, which is used to shift an optical system or an imaging element to a middle position of a range movable in the planar direction perpendicular to the optical axis, and a shake reference signal used as a reference voltage of the shake detection signal to the AD conversion unit 5. In general, the shake reference signal changes due to changing external factors, such as an offset voltage and an ambient temperature.

The A/D conversion unit 5 performs A/D conversion of the shake detection signal and the shake reference signal and then outputs the shake detection signal to the signal processing unit 2 and outputs the shake reference signal to the signal processing unit 2 and the control operation unit 4. The signal processing unit 2 amplifies and smoothes a differential voltage between the shake reference signal and the shake detection signal from the A/D conversion unit 5 and outputs the result to the control operation unit 4.

The control operation unit 4 receives the shake reference signal from the A/D conversion unit 5, generates a control signal for controlling the adjustment unit 3 such that an output voltage from the signal processing unit 2 becomes a predetermined value on the basis of the shake reference signal, outputs the control signal to the adjustment unit 3, and stores a control value related to the control of the adjustment unit 3 in the memory 4a. The adjustment unit 3 generates an adjustment signal corresponding to the control signal from the control operation unit 4 and outputs the adjustment signal to the signal processing unit 2.

Here, in order to improve the detection accuracy of a zero point, it is necessary to adjust the control signal of the adjustment unit 3 such that the output voltage from the signal processing unit 2 becomes a predetermined value according to a change of the shake reference signal caused by a changing external factor. In addition, it is desirable to control the adjustment unit 3 such that the predetermined value becomes equal to a midpoint voltage of the signal processing unit 2, at which an output voltage range is widest, in consideration of appropriately detecting the amount of shake of the imaging apparatus occurring when the imaging apparatus is held in an unstable state.

Therefore, the control operation unit 4 adjusts the output voltage from the signal processing unit 2 to a predetermined value according to the change of the shake reference signal caused by a changing external factor by generating a control signal, which makes the output voltage of the adjustment unit 3 satisfy the above expression (8), and outputting the control signal to the adjustment unit 3. In addition, the control operation unit 4 makes the control value used for the control of the adjustment unit 3 in the first period stored in the memory 4a.

Next, an operation of the shake detector 11 in a period (hereinafter, referred to as a second period) for which the imaging apparatus is not fixed to an antivibration device, such as a tripod, and is held in an unstable state at timing related to actual photographing of a photographic subject, for example a period after turning on the power of the imaging apparatus or setting a release switch, will be described. The shake detection unit 1 detects the amount of shake of the imaging apparatus occurring at the time of photographing and outputs a shake detection signal, which is used to shift the optical system or the imaging element in the planar direction perpendicular to the optical axis according to the detected amount of shake, and a shake reference signal used as a reference voltage of the shake detection signal to the A/D conversion unit 5. In general, the shake reference signal changes to a different value from that in the first period due to changing external factors, such as the ambient temperature.

The A/D conversion unit 5 performs A/ID conversion of the shake detection signal and the shake reference signal and then outputs the shake detection signal to the signal processing unit 2 and outputs the shake reference signal to the signal processing unit 2 and the control operation unit 4. The signal processing unit 2 amplifies and smoothes a differential voltage between the shake reference signal and the shake detection signal from the A/D conversion unit S and outputs the result to the control operation unit 4.

The control operation unit 4 receives the shake reference signals, generates a control signal for controlling the adjustment unit 3 such that an output voltage from the signal processing unit 2 becomes a predetermined value on the basis of a difference between the shake reference signals in the first and second periods, and outputs the control signal to the adjustment unit 3. The adjustment unit 3 generates an adjustment signal corresponding to the control signal from the control operation unit 4 and outputs the adjustment signal to the signal processing unit 2.

Here, it is desirable to control the adjustment unit 3 such that the predetermined value becomes equal to a midpoint voltage of the signal processing unit 2, at which an output voltage range is widest, in consideration of appropriately detecting the amount of shake of the imaging apparatus occurring when the imaging apparatus is held in an unstable state. Therefore, the control operation unit 4 generates a control signal, which makes the output voltage of the adjustment unit 3 satisfy the expression (14), and outputs the control signal to the adjustment unit 3. The above operation is continuously performed until the imaging apparatus is powered off or the release switch is released.

As described above, according to the present embodiment, the correction accuracy of a zero point can be improved and the shake detection accuracy can be improved similar to the first embodiment. As a result, the shift position of the optical system or the imaging element of the imaging apparatus can be determined with high precision according to the amount of shake occurring at the time of photographing. In addition, since various kinds of signal processing in the shake detector 11 can be performed in a digital space by inserting the A/D conversion unit 5 between the shake detection unit 1 and the signal processing unit 2, the power consumption can be reduced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

According to the aspect of the invention, since it becomes possible to correct a zero point in the first period by controlling the adjustment unit on the basis of a reference signal not including the amount of shake, and to correct a zero point in the second period by controlling the adjustment unit on the basis of the reference signal and the correction result (control value) of the zero point in the first period, effects that the correction accuracy of the zero point is improved and the shake detection accuracy is improved can be obtained.

What is claimed is:

1. A shake detector comprising:
    a shake detection unit that detects an amount of shake of an imaging apparatus, and outputs a shake detection signal indicating the detected amount of shake and a reference signal used as a reference of the shake detection signal;
    a signal processing unit that amplifies and smoothes the shake detection signal and the reference signal from the shake detection unit, and outputs the shake detection signal as a signal used in subsequent processing for offsetting the amount of shake of the imaging apparatus;
    an adjustment unit that outputs an adjustment signal for adjusting an output signal from the signal processing unit; and
    a control operation unit that, in a first period for which there is no shake in the imaging apparatus, stores a control value for controlling the adjustment unit such that the output signal from the signal processing unit has a predetermined value on the basis of the reference signal from the shake detection unit, and that, in a second period different from the first period, generates and outputs a control signal for controlling the adjustment unit on the basis of both the reference signal from the shake detection unit and the control value stored in the first period.

2. The shake detector according to claim 1, further comprising an A/D conversion unit that converts the shake detection signal and the reference signal from the shake detection unit, which are analog signals, into digital signals, wherein the signal processing unit amplifies and smoothes the shake detection signal and the reference signal in a digital space.

3. The shake detector according to claim 1, wherein, in the first period, the control operation unit stores the control value for controlling the adjustment unit such that the output signal from the signal processing unit becomes equal to a midpoint voltage of a maximum output voltage and a minimum output voltage of the signal processing unit on the basis of the reference signal from the shake detection unit.

4. The shake detector according to claim 1, wherein the second period is a period after the imaging apparatus is powered on.

5. The shake detector according to claim 1, wherein the second period is a period after a release switch of the imaging apparatus is set.

* * * * *